(12) United States Patent
Kawasoe et al.

(10) Patent No.: US 11,764,403 B2
(45) Date of Patent: Sep. 19, 2023

(54) NONAQUEOUS ELECTROLYTE SECONDARY BATTERY

(71) Applicant: GS Yuasa International Ltd., Kyoto (JP)

(72) Inventors: Yudai Kawasoe, Kyoto (JP); Kenta Nagamine, Kyoto (JP); Keisuke Anami, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 297 days.

(21) Appl. No.: 16/754,784

(22) PCT Filed: Oct. 15, 2018

(86) PCT No.: PCT/JP2018/038324
§ 371 (c)(1),
(2) Date: Apr. 9, 2020

(87) PCT Pub. No.: WO2019/078159
PCT Pub. Date: Apr. 25, 2019

(65) Prior Publication Data
US 2020/0303777 A1    Sep. 24, 2020

(30) Foreign Application Priority Data
Oct. 16, 2017 (JP) ................................. 2017-200427

(51) Int. Cl.
*H01M 10/0569* (2010.01)
*H01M 10/0525* (2010.01)
(Continued)

(52) U.S. Cl.
CPC ......... *H01M 10/0569* (2013.01); *H01M 4/13* (2013.01); *H01M 10/0525* (2013.01);
(Continued)

(58) Field of Classification Search
CPC ......... H01M 10/0569; H01M 10/0525; H01M 10/0568; H01M 2004/027; H01M 2004/028
See application file for complete search history.

(56) References Cited

U.S. PATENT DOCUMENTS

2007/0037063 A1    2/2007   Choi et al.
2007/0054179 A1    3/2007   Kusachi et al.
(Continued)

FOREIGN PATENT DOCUMENTS

| JP | 2007-19027 A | 1/2007 |
| JP | 2007-141733 A | 6/2007 |

(Continued)

OTHER PUBLICATIONS

International Search Report (ISR) dated Jan. 15, 2019 filed in PCT/JP2018/038324.
(Continued)

*Primary Examiner* — Osei K Amponsah
(74) *Attorney, Agent, or Firm* — Rankin, Hill & Clark LLP

(57) ABSTRACT

A nonaqueous electrolyte secondary battery disclosed herein includes a positive electrode plate including a positive composite layer, a negative electrode plate including a negative composite layer, and a nonaqueous electrolyte, in which the negative composite layer is composed of a facing portion facing a surface of the positive composite layer, and a non-facing portion that is on the same surface as the facing portion and does not face the surface of the positive composite layer, and the area ratio of the non-facing portion to a combined area of the facing portion and the non-facing portion of the negative composite layer is 7% or more, and the nonaqueous electrolyte contains a fluorinated carbonate and a cyclic sulfone compound.

8 Claims, 1 Drawing Sheet

(51) Int. Cl.
*H01M 10/0568* (2010.01)
*H01M 4/13* (2010.01)
*H01M 4/02* (2006.01)

(52) U.S. Cl.
CPC .. *H01M 10/0568* (2013.01); *H01M 2004/027* (2013.01); *H01M 2004/028* (2013.01); *H01M 2300/0034* (2013.01)

(56) References Cited

U.S. PATENT DOCUMENTS

| | | |
|---|---|---|
| 2007/0117024 A1 | 5/2007 | Nakai et al. |
| 2007/0148541 A1 | 6/2007 | Wakita et al. |
| 2009/0226808 A1 | 9/2009 | Hiwara et al. |
| 2011/0159368 A1 | 6/2011 | Hirose et al. |
| 2014/0322576 A1 | 10/2014 | Okumura et al. |
| 2014/0370346 A1 | 12/2014 | Okumura et al. |
| 2015/0140443 A1* | 5/2015 | Takahashi ............ H01M 4/505 29/623.5 |
| 2015/0303521 A1 | 10/2015 | Sasaki et al. |
| 2016/0322667 A1 | 11/2016 | Maeda et al. |
| 2017/0104240 A1* | 4/2017 | Arima ............... H01M 10/0525 |
| 2017/0133709 A1 | 5/2017 | Masuda et al. |
| 2017/0352908 A1 | 12/2017 | Noguchi et al. |

FOREIGN PATENT DOCUMENTS

| | | |
|---|---|---|
| JP | 2007-188861 A | 7/2007 |
| JP | 2008-140683 A | 6/2008 |
| JP | 2009-218191 A | 9/2009 |
| JP | 2013-051200 A | 3/2013 |
| JP | 5192237 B2 | 5/2013 |
| JP | 2013-145732 A | 7/2013 |
| JP | 2014-22335 A | 2/2014 |
| JP | 2014-170624 A | 9/2014 |
| JP | 2015-8160 A | 1/2015 |
| JP | 2015-176760 A | 10/2015 |
| JP | 2016-58264 A | 4/2016 |
| JP | 2017-27959 A | 2/2017 |
| JP | 2017-117778 A | 6/2017 |
| JP | 2017-152262 A | 8/2017 |
| WO | 2005/029613 A1 | 3/2005 |
| WO | 2013/128676 A1 | 9/2013 |
| WO | 2013/128679 A1 | 9/2013 |
| WO | 2013/183655 A1 | 12/2013 |
| WO | 2014/080871 A1 | 5/2014 |
| WO | 2015/098624 A1 | 7/2015 |
| WO | 2015/147000 A1 | 10/2015 |
| WO | 2016/063902 A1 | 4/2016 |

OTHER PUBLICATIONS

Extended European Search Report (EESR) dated Oct. 30, 2020 issued in the corresponding European Patent Application No. 18869354.3.

* cited by examiner

NONAQUEOUS ELECTROLYTE SECONDARY BATTERY

TECHNICAL FIELD

The present invention relates to a nonaqueous electrolyte secondary battery.

BACKGROUND ART

Nonaqueous electrolyte secondary batteries represented by lithium ion secondary batteries are widely used as power supplies for mobile devices because of their high energy density. Further, nonaqueous electrolyte secondary batteries are expected to be developed for applications such as power storage, electric vehicles, and hybrid vehicles in the future.

With the expansion of applications, nonaqueous electrolyte secondary batteries are required to have even higher energy density, and therefore, voltage of batteries is required to be increased. It is known to use a fluorinated carbonate (for example, fluoroethylene carbonate), which has excellent oxidation resistance and is expected to have an effect of improving charge-discharge cycle performance, as an electrolyte solution of a nonaqueous electrolyte solution secondary battery. However, when a fluorinated carbonate is used under a high voltage, there is a problem that the fluorinated carbonate is reduced, and the reduction product is oxidized and decomposed at a positive electrode to lower battery capacity.

PRIOR ART DOCUMENTS

Patent Documents

Patent Document 1: JP-A-2007-188861
Patent Document 2: JP-A-2008-140683
Patent Document 3: JP-A-2014-22335

SUMMARY OF THE INVENTION

Problems to be Solved by the Invention

A nonaqueous electrolyte secondary battery is configured such that an area of a negative composite layer of a negative electrode is larger than an area of a positive composite layer of a positive electrode on a surface where the positive electrode and the negative electrode face each other, in order to avoid an internal short-circuit caused by lithium deposition. The inventors of the present invention have found that such a configuration is one of the causes of promotion of reduction of fluorinated carbonate (as a result, reduction of battery capacity). More specifically, it was found that, in the negative composite layer not facing the positive composite layer, a film (SEI) formed during initial charge may be insufficient, and the insufficient formation of SEI film is one of the causes that the fluorinated carbonate is reduced. In a nonaqueous electrolyte secondary battery including a negative composite layer having many portions not facing a positive composite layer, reduction of battery capacity due to oxidative decomposition of the above reduction product is particularly remarkable.

An object of the present invention is to provide a nonaqueous electrolyte secondary battery in which reduction of capacity is suppressed, while the nonaqueous electrolyte secondary battery contains a fluorinated carbonate in a nonaqueous electrolyte, and a negative composite layer has a sufficiently larger area than a positive composite layer.

Means for Solving the Problems

The nonaqueous electrolyte secondary battery of the present invention includes a positive electrode plate including a positive composite layer, a negative electrode plate including a negative composite layer, and a nonaqueous electrolyte containing a fluorinated carbonate, in which the negative composite layer is composed of a facing portion facing a surface of the positive composite layer, and a non-facing portion that is on the same surface as the facing portion and does not face the surface of the positive composite layer, and the area ratio of the non-facing portion to a combined area of the facing portion and the non-facing portion of the negative composite layer is 7% or more, and the nonaqueous electrolyte contains a cyclic sulfone compound.

Advantages of the Invention

According to the present invention, a nonaqueous electrolyte secondary battery in which reduction of capacity is suppressed, while the nonaqueous electrolyte secondary battery contains a fluorinated carbonate in a nonaqueous electrolyte and has high voltage, and a negative composite layer has a sufficiently larger area than a positive composite layer.

MODE FOR CARRYING OUT THE INVENTION

<Overview of Nonaqueous Electrolyte Secondary Battery>

Figure 1:
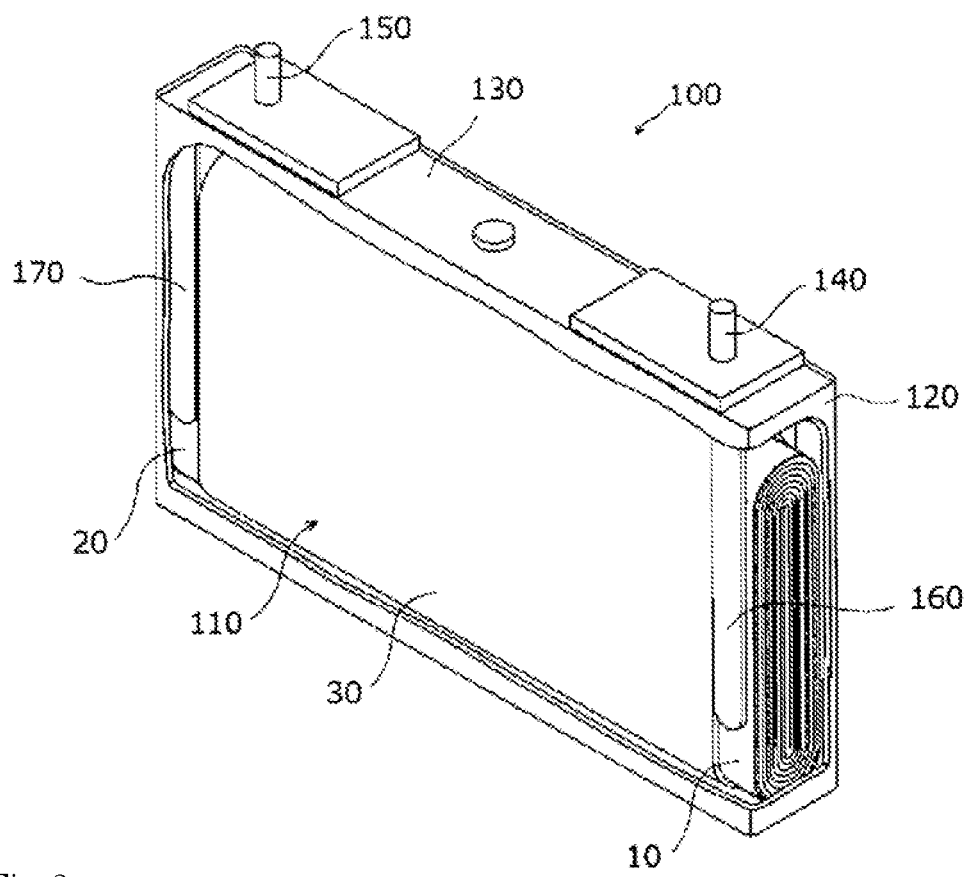
FIG. 1 is a partially cutaway perspective view showing a schematic configuration of a nonaqueous electrolyte secondary battery according to one embodiment of the present invention.

FIG. 1 is a partially cutaway perspective view showing a schematic configuration of a nonaqueous electrolyte secondary battery according to one embodiment of the present invention. A nonaqueous electrolyte secondary battery 100 includes a positive electrode plate 10 including a positive composite layer and a negative electrode plate 20 including a negative composite layer. Typically, as shown in FIG. 1, the nonaqueous electrolyte secondary battery 100 includes a power generating element 110 configured by winding the positive electrode plate 10 and the negative electrode plate 20 with a separator 30 interposed therebetween. The power generating element 110 is housed in a battery case 120 with the separator 30 impregnated with a nonaqueous electrolyte. The battery case 120 is, for example, a substantially box shape having an opening on an upper surface side. The opening is closed by a plate-shaped battery lid 130. The battery lid 130 is provided with a positive electrode terminal 140 and a negative electrode terminal 150, and the positive electrode terminal 140 is electrically connected to the positive electrode plate 10 via a positive electrode lead 160, and the negative electrode terminal 150 is electrically connected to the negative electrode plate 20 via a negative electrode lead 170.

Figure 2:
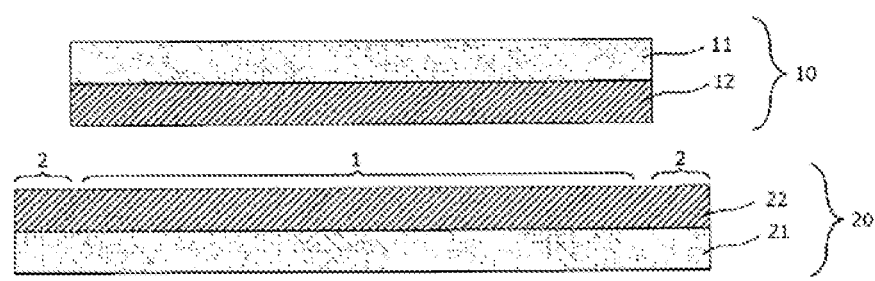
FIG. 2 is a schematic cross-sectional view schematically showing a positive electrode plate and a negative electrode plate in a nonaqueous electrolyte secondary battery according to one embodiment of the present invention.

FIG. 2 is a schematic cross-sectional view schematically showing a positive electrode plate and a negative electrode plate in a nonaqueous electrolyte secondary battery according to one embodiment of the present invention. In FIG. 2, illustration of other members such as a separator is omitted. A positive electrode plate 10 includes a positive electrode current collector 11 and a positive composite layer 12 disposed on at least one surface of the positive electrode current collector 11. The negative electrode plate 20 includes a negative electrode current collector 21, and a negative composite layer 22 disposed on at least one surface of the negative electrode current collector 21. The positive electrode plate 10 is disposed such that the positive composite layer 12 faces the negative composite layer 22. The negative composite layer 22 is composed of a facing portion 1 facing the surface of the positive composite layer 12, and a non-facing portion 2 that is on the same surface as the facing portion 1 and does not face the surface of the positive composite layer 12. By providing the non-facing portion 2, an internal short-circuit due to lithium deposition can be prevented.

The area ratio of the non-facing portion 2 to a combined area of the facing portion 1 and the non-facing portion 2 of the negative composite layer 22 is 7% or more. In the present embodiment, a cyclic sulfone compound in the nonaqueous electrolyte is contained as described below, whereby reduction of capacity of the nonaqueous electrolyte secondary battery can be suppressed, even if the area of the non-facing portion 2 is increased (that is, even if the area ratio is 7% or more). In one embodiment, the area ratio of the non-facing portion 2 to the combined area of the facing portion 1 and the non-facing portion 2 of the negative composite layer 22 is preferably 7% to 20%, and more preferably 7% to 15%. In some embodiments, the area ratio of the non-facing portion 2 may be, for example, 9% or more, or 10% or more (for example, 12% or more). The technology disclosed herein can also be implemented in an embodiment in which the area ratio of the non-facing portion 2 is 9% or more and 20% or less (for example, 12% or more and 18% or less).

The nonaqueous electrolyte contains a fluorinated carbonate and a cyclic sulfone compound. By using a fluorinated carbonate that is not easily oxidized, problems such as gas generation can be suppressed even under a high voltage. Further, a nonaqueous electrolyte secondary battery having excellent cycle performance can be obtained.

In the present embodiment, the cyclic sulfone compound is contained in the nonaqueous electrolyte, whereby a SEI film can be favorably formed on the negative composite layer. That is, the cyclic sulfone compound is reductively decomposed on the surface of the negative electrode at the time of initial charge, and the decomposition product can form a strong polymerizable film containing sulfur on the surface of the negative electrode. In addition, even in the non-facing portion of the negative composite layer that is less likely to have a potential lower than the facing portion of the negative composite layer during charge, the above-described reductive decomposition proceeds appropriately, so that a strong polymerizable film can be sufficiently formed also on the non-facing portion of the negative composite layer. Therefore, it is presumed that the SEI film can be favorably formed on the non-facing portion of the negative composite layer, and reductive decomposition of fluorinated carbonate can be effectively prevented. As a result, even in a nonaqueous electrolyte secondary battery having a large area of the non-facing portion of the negative composite layer and containing a fluorinated carbonate in the nonaqueous electrolyte, reduction of capacity can be suppressed. Where the reduction of capacity due to decomposition of the fluorinated carbonate becomes remarkable under a high voltage, especially in a nonaqueous electrolyte secondary battery in which the positive electrode potential based on lithium during charge reaches 4.4 V (vs. Li/Li$^+$) or more, formation of good SEI film at the non-facing portion is effective in suppressing the reduction of capacity.

<Nonaqueous Electrolyte>

In one embodiment, the nonaqueous electrolyte is a nonaqueous electrolyte solution. As described above, the nonaqueous electrolyte contains a fluorinated carbonate. As the fluorinated carbonate, a compound in which some or all of hydrogen atoms of the carbonate are substituted with fluorine atoms can be used without particular limitation. As used herein, the "carbonate" refers to a compound having a carbohydrate structure (—O—(C=O)—O—) in a molecule. The carbonate may be a chain carbonate or a cyclic carbonate. Further, the term "cyclic carbonate" used herein is a concept that includes each geometric isomer.

As the chain carbonate, a chain carbonate having 3 to 15 carbon atoms (for example, 3 to 10, preferably 3 to 8, and more preferably 3 to 6) can be preferably employed. Examples of the chain carbonate having 3 to 15 carbon atoms include diethyl carbonate (DEC), dimethyl carbonate (DMC), ethyl methyl carbonate (EMC), diphenyl carbonate, and the like. A fluorinated chain carbonate in which some or all of the hydrogen atoms of the chain carbonate are substituted with fluorine atoms can be suitably used. The number of fluorine atoms in the fluorinated chain carbonate is not particularly limited as long as it is one or more, but may be, for example, 1 to 10, and preferably 1 to 8. In some embodiments, the number of fluorine atoms in the fluorinated chain carbonate may be, for example, 1 to 6, or 1 to 4 (for example, 1 or 2).

As the cyclic carbonate, a cyclic carbonate having 3 to 15 carbon atoms (for example, 3 to 10, preferably 3 to 8, and more preferably 3 to 6) can be preferably employed. Examples of the cyclic carbonate having 3 to 15 carbon atoms include ethylene carbonate (EC; also referred to as 1,3-dioxolan-2-one), propylene carbonate (PC; also referred to as 4-methyl-1,3-dioxolan-2-one), butylene carbonate (BC; also referred to as 4,5-dimethyl-1,3-dioxolan-2-one), pentylene carbonate, vinylene carbonate (VC), vinylethylene carbonate (VEC), and derivatives thereof. A fluorinated cyclic carbonate in which some or all of the hydrogen atoms of the cyclic carbonate are substituted with fluorine atoms can be suitably used. The number of fluorine atoms in the fluorinated cyclic carbonate is not particularly limited as long as it is one or more, but may be, for example, 1 to 10, and preferably 1 to 8. In some embodiments, the number of fluorine atoms in the fluorinated cyclic carbonate may be, for example, 1 to 6, or 1 to 4 (for example, 1 or 2).

Preferred examples of the fluorinated cyclic carbonate include fluorinated ethylene carbonates such as monofluoroethylene carbonate (FEC) and difluoroethylene carbonate (DFEC); fluorinated propylene carbonates such as monofluoropropylene carbonate (FPC), difluoropropylene carbonate (DFPC) and trifluoropropylene carbonate (TFPC); fluorinated butylene carbonates such as monofluorobutylene carbonate, difluorobutylene carbonate and trifluorobutylene carbonate; and the like. Among them, FEC, DFEC, FPC and TFPC are preferable, FEC or DFEC is more preferable, and FEC is particularly preferable, from the viewpoint of improving charge-discharge cycle characteristics under a high voltage.

The above-mentioned fluorinated carbonates (that is, fluorinated chain carbonates and fluorinated cyclic carbonates) can be used alone or as a mixture of two or more kinds.

The nonaqueous electrolyte may further include any suitable nonaqueous solvent other than the fluorinated carbonates. Examples of the nonaqueous solvent include chain carbonates such as ethyl methyl carbonate (EMC), dimethyl carbonate (DMC), diethyl carbonate (DEC) and diphenyl carbonate; cyclic carbonates such as ethylene carbonate, propylene carbonate, butylene carbonate, chloroethylene carbonate and vinylene carbonate; cyclic esters such as γ-butyrolactone, γ-valerolactone and propiolactone; and the like. Among them, EMC, DMC and DEC are preferable, and EMC is particularly preferable. The nonaqueous solvents other than these fluorinated carbonates may be used alone, or in a combination of two or more kinds.

The content of the fluorinated carbonate is preferably 5% by volume to 30% by volume, more preferably 8% by volume to 25% by volume, and further preferably 10% by volume to 20% by volume, based on the total amount of the nonaqueous electrolyte excluding an electrolyte salt. Within such ranges, a nonaqueous electrolyte secondary battery having excellent charge-discharge cycle characteristics under a high voltage can be obtained. Further, in the present embodiment, a cyclic sulfone compound is contained, whereby the reductive decomposition of fluorinated carbonate is suppressed, so that even without using a large amount of fluorinated carbonate, the effect (for example, improvement in charge-discharge cycle characteristics) can be obtained. When the amount of the fluorinated carbonate used is reduced, a nonaqueous electrolyte having appropriate viscosity and excellent ion conductivity can be obtained.

The technology disclosed herein can be preferably implemented in an embodiment in which the content of the fluorinated carbonate is, for example, more than 8% by weight and 35% by weight or less (particularly 10% by weight or more and 30% by weight or less), based on the total weight of the nonaqueous electrolyte.

Preferably, the reduction potential of the cyclic sulfone compound is higher than the reduction potential of the fluorinated carbonate. Such a cyclic sulfone compound can contribute to formation of SEI film prior to the fluorinated carbonate. Therefore, when a cyclic sulfone compound having a higher reduction potential than the fluorinated carbonate is used, the reductive decomposition of fluorinated carbonate is suppressed, and a nonaqueous electrolyte secondary battery with small reduction of capacity can be obtained.

Examples of preferred cyclic sulfone compound from the above viewpoint include cyclic unsaturated sultone compounds A represented by the following general formula (1) or cyclic sulfate esters B represented by the following general formula (2).

[Chemical Formula 1]

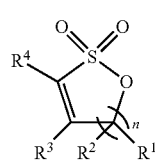
(1)

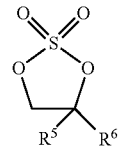
(2)

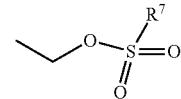
(3)

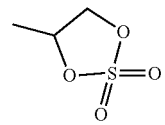
(4)

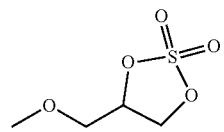
(5)

In the general formula (1), in the formula, R1, R2, R3 and R4 are each independently hydrogen, fluorine, or a hydrocarbon group having 1 to 4 carbon atoms which may contain fluorine, and n is an integer of 1 to 3. n can be, for example, 1 or 2. In the general formula (2), in the formula, R5 is hydrogen, fluorine, or a hydrocarbon group having 1 to 4 carbon atoms which may contain fluorine. R6 is a group represented by formula (3), formula (4) or formula (5). R7 is an alkyl group having 1 to 3 carbon atoms which may contain a halogen. Further, "—" at the left end of the structural formulas (3) to (5) represents a bond. In addition, the term "cyclic sulfone compound" used herein is a concept that includes each geometric isomer.

In the cyclic unsaturated sultone compounds A represented by the general formula (1), R1, R2, R3 and R4 may be the same or different from each other. R1, R2, R3 and R4 can be a hydrogen atom, a fluorine atom, or a hydrocarbon group having 1 to 4 carbon atoms which may contain fluorine. When R1, R2, R3 and R4 are hydrocarbon groups, R1, R2, R3 and R4 may be linear or branched. From the viewpoint of reducing the viscosity of the nonaqueous electrolyte solution, the hydrocarbon group is preferably linear. For example, R1, R2, R3 and R4 can be an alkyl group having 1 to 4 carbon atoms (for example, 1 to 3, typically 1 or 2). Examples of the alkyl group having 1 to 4 carbon atoms include a methyl group, an ethyl group, an n-propyl group, an isopropyl group, an n-butyl group, an isobutyl group, a sec-butyl group, a t-butyl group, and the like. In addition, from the viewpoint of enhancing oxidation resistance or the like, a group having a structure in which one or more hydrogen atoms of these alkyl chain skeletons are substituted with fluorine atoms (that is, a fluorinated alkyl group having 1 to 4 carbon atoms) may be used. When a fluorinated alkyl group is employed, the number of fluorine atoms is not particularly limited as long as it is one or more, but can be, for example, 1 to 12 (typically 1 to 6, for example, 1 to 3). The cyclic unsaturated sultone compound A has an unsaturated bond in a cyclic group containing S, and is quickly polymerized by reductive decomposition to easily form a film having a protective function. Therefore, when the cyclic unsaturated sultone compound A is added, the SEI film can be favorably formed on the non-facing portion of the negative composite layer, and the reductive decomposition of fluorinated carbonate can be effectively prevented. It is also preferable in that the viscosity of the nonaqueous electrolyte can be appropriately maintained. Further, by using the cyclic unsaturated sultone compound A, a film having high thermal stability can be formed, thus it is also preferable in that an effect of suppressing reduction of capacity at high temperatures can be obtained.

Preferred examples of the cyclic unsaturated sultone compound A include those in which all of R1, R2, R3 and R4 are hydrogen atoms or fluorine atoms. The number of fluorine atoms in the cyclic unsaturated sultone compound A is preferably 3 or less (for example, 2 or less, typically 0 or 1). Specific examples of such a cyclic unsaturated sultone compound A include 1,3-propene sultone, 1-fluoro-1,3-propene sultone, 2-fluoro-1,3-propene sultone, 3-fluoro-1,3-propene sultone, and the like. Among them, 1,3-propene sultone or 1-fluoro-1,3-propene sultone is preferable, and 1,3-propene sultone is particularly preferable, from the viewpoint of suitably exhibiting an action of the cyclic unsaturated sultone compound A.

Other preferred examples of the cyclic unsaturated sultone compound A include hydrocarbon groups having 1 to 4 carbon atoms in which one of R1, R2, R3 and R4 may contain fluorine, and the remaining three are hydrogen atoms or fluorine atoms. Specific examples of such a cyclic unsaturated sultone compound A include 1-methyl-1,3-propene sultone, 2-methyl-1,3-propene sultone, 3-methyl-1,3-propene sultone, and the like.

Other preferred examples of the cyclic unsaturated sultone compound A include hydrocarbon groups having 1 to 4 carbon atoms in which two of R1, R2, R3 and R4 may contain fluorine, and the remaining two are hydrogen atoms or fluorine atoms. Specific examples of such a cyclic unsaturated sultone compound A include 1,3-propane sultone, 1,1-dimethyl-1,3-propene sultone, 1,2-dimethyl-1,3-propene sultone, and the like.

In the cyclic sulfate ester B represented by the general formula (2), R5 may be a hydrogen atom, a fluorine atom, or a hydrocarbon group having 1 to 4 carbon atoms which may contain fluorine. When R5 is a hydrocarbon group, R5 may be linear or branched. From the viewpoint of reducing the viscosity of the nonaqueous electrolyte solution, the hydrocarbon group is preferably linear. For example, R5 can be an alkyl group having 1 to 4 carbon atoms (for example, 1 to 3, typically 1 or 2). Examples of the alkyl group having 1 to 4 carbon atoms include a methyl group, an ethyl group, an n-propyl group, an isopropyl group, an n-butyl group, an isobutyl group, a sec-butyl group, a t-butyl group, and the like. In addition, from the viewpoint of enhancing oxidation resistance or the like, a group having a structure in which one or more hydrogen atoms of these alkyl chain skeletons are substituted with fluorine atoms (that is, a fluorinated alkyl group having 1 to 4 carbon atoms) may be used. When a fluorinated alkyl group is employed, the number of fluorine atoms is not particularly limited as long as it is one or more, but can be, for example, 1 to 12 (typically 1 to 6, for example, 1 to 3). R7 is an alkyl group having 1 to 3 carbon atoms which may contain a halogen. Examples of the alkyl group having 1 to 3 carbon atoms include a methyl group, an ethyl group, an n-propyl group, an isopropyl group, and the like. Further, a group having a structure in which one or more hydrogen atoms of these alkyl chain skeletons are substituted with halogen atoms (that is, a halogenated alkyl group having 1 to 3 carbon atoms) may be used. Examples of the halogen atom include a fluorine atom (F), a chlorine atom (Cl), a bromine atom (Br), and the like. When a halogenated alkyl group is employed, the number of halogen atoms is not particularly limited as long as it is one or more, but can be, for example, 1 to 9 (typically 1 to 3, for example, 1 or 2). Since the cyclic sulfate ester B has two sulfate ester structures in its skeleton, it is quickly polymerized by reductive decomposition to form a film having a protective function. Therefore, when the cyclic sulfate ester B is added, the SEI film can be favorably formed on the non-facing portion of the negative composite layer, and the reductive decomposition of fluorinated carbonate can be effectively prevented. It is also preferable in that the viscosity of the nonaqueous electrolyte can be appropriately maintained. Further, by using the cyclic sulfate ester B, a film having high Li ion conductivity can be formed, thus it is also preferable in that an effect of reducing resistance especially at low temperatures can be obtained.

Preferred examples of the cyclic sulfate ester B include those in which R5 is a hydrogen atom, a fluorine atom, or a hydrocarbon group having 1 to 4 carbon atoms which may contain fluorine, and R6 is a group represented by the formula (4). Among them, those in which R5 is a hydrogen atom or an alkyl group having 1 to 3 carbon atoms, and R6 is a group represented by the formula (4) are preferable. Specific examples of such a cyclic sulfate ester B include diglycol sulfate, and the like. As described above, a compound having a structural skeleton obtained by further adding a cyclic sulfate ester structure to one cyclic sulfate ester structure is contained in the electrolyte solution, whereby continuous reductive decomposition of the fluorinated carbonate can be better suppressed.

Other preferred examples of the cyclic sulfate ester B include those in which R5 is a hydrogen atom, a fluorine atom, or a hydrocarbon group having 1 to 4 carbon atoms which may contain fluorine, R6 is a group represented by the formula (3), and R7 is an alkyl group having 1 to 3 carbon atoms which may contain a halogen. Among them, it is preferable that R5 is a hydrogen atom or an alkyl group having 1 to 4 carbon atoms, R6 is a group represented by the formula (3), and R7 is an alkyl group having 1 to 3 carbon atoms. Specific examples of such a cyclic sulfate ester B include 4-methylsulfonyloxymethyl-2,2-dioxo-1,3,2-dioxathiolane, 4-ethylsulfonyloxymethyl-2,2-dioxo-1,3,2-dioxathiolane, and the like. As described above, while the number of rings is one, a compound combined with two sulfonic acids is contained in the electrolyte solution, whereby the continuous reductive decomposition of the fluorinated carbonate can be better suppressed.

Other preferred examples of the cyclic sulfate ester B include those in which R5 is a hydrogen atom, a fluorine atom, or a hydrocarbon group having 1 to 4 carbon atoms which may contain fluorine, and R6 is a group represented by the formula (5). Among them, those in which R5 is a hydrogen atom or an alkyl group having 1 to 3 carbon atoms, and R6 is a group represented by the formula (5) are preferable. As described above, a compound having a structural skeleton obtained by further adding a cyclic sulfate ester structure to one cyclic sulfate ester structure is contained in the electrolyte solution, whereby continuous reductive decomposition of the fluorinated carbonate can be better suppressed.

Other examples of the cyclic sulfone compound that can be used in the nonaqueous electrolyte secondary battery of the present embodiment include 1,3-propane sultone, ethylene sulfate, methylene methane disulfonate, ethylene methane disulfonate, propylene methane disulfonate, ethylene glycol cyclic sulfate, propylene glycol cyclic sulfate, and the like.

The above-mentioned cyclic sulfone compounds can be used alone or as a mixture of two or more kinds. In a preferred embodiment, the nonaqueous electrolyte contains the above-described cyclic unsaturated sultone compound A and cyclic sulfate ester B as the cyclic sulfone compound. As described above, by using the cyclic unsaturated sultone compound A and the cyclic sulfate ester B in combination, the above-described effect of suppressing reduction of capacity at high temperatures and effect of reducing resistance at low temperatures can be both achieved at a high level.

The content of the cyclic sulfone compound is preferably 0.1 parts by weight to 5.0 parts by weight, more preferably 0.2 parts by weight to 4.0 parts by weight, and further preferably 0.5 parts by weight to 2.0 parts by weight, based on 100 parts by weight of the nonaqueous electrolyte. Within such ranges, the SEI film can be favorably formed, and a nonaqueous electrolyte secondary battery with less reduction of capacity can be obtained. Further, by setting the content of the cyclic sulfone compound to 5.0 parts by weight or less, gas generation due to a decomposition reaction of the cyclic sulfone compound can be suppressed. As a result, problems such as an increase in internal resistance can be prevented.

The content of the cyclic sulfone compound is preferably 0.3 parts by weight to 90 parts by weight, more preferably 10 parts by weight to 70 parts by weight, and further preferably 20 parts by weight to 50 parts by weight, based on 100 parts by weight of the fluorinated carbonate. In some embodiments, the content of the cyclic sulfone compound may be, for example, 40 parts by weight or less, or 30 parts by weight or less (for example, 25 parts by weight or less), based on 100 parts by weight of the fluorinated carbonate. Within such ranges, the SEI film can be favorably formed, and a nonaqueous electrolyte secondary battery with less reduction of capacity can be obtained. Further, by setting the content of the cyclic sulfone compound to 90 parts by weight or less, gas generation due to a decomposition reaction of the cyclic sulfone compound and excessive formation of the SEI film can be suppressed. As a result, problems such as an increase in internal resistance can be prevented.

The nonaqueous electrolyte may further include an electrolyte salt. As the electrolyte salt, a lithium salt or the like which is stable in a wide potential region can be used. Specifically, examples include lithium salts such as $LiPF_6$, $LiPF_2(C_2O_4)_2$ and $LiPF_4(C_2O_4)$, $LiClO_4$, $LiBF_4$, $LiAsF_6$, and $LiCF_3CO_2$. The electrolyte salts may be used alone, or in a combination of two or more kinds.

The concentration of the electrolyte salt in the nonaqueous electrolyte is preferably 0.1 mol/L to 5 mol/L, and more preferably 0.5 mol/L to 2.5 mol/L.

The nonaqueous electrolyte may further contain additives such as a negative electrode film forming agent, a positive electrode protective agent, and an overcharge preventing agent, as necessary.

<Negative Electrode Plate>

As described above, a negative electrode plate includes a negative electrode current collector, and a negative composite layer disposed on at least one surface of the negative electrode current collector. As the negative electrode current collector, for example, a metal foil such as a copper foil is used.

The negative composite layer contains a negative active material capable of absorbing and desorbing lithium ions. Examples of the negative active material include graphites (natural graphites, artificial graphites), cokes, carbon materials such as active carbon, alloys of aluminum, silicon, lead, tin, zinc, cadmium or the like with lithium, lithium metals, metal oxides such as $LiFe_2O_3$, $WO_2$, $MoO_2$, $SiO$, and $CuO$, and the like. The negative active materials may be used alone, or in a combination of two or more kinds.

The negative composite layer may further include additives such as a binder, a conductive agent, a thickener, and a filler. Examples of the binder include polyvinylidene fluoride, styrene butadiene rubber, carboxymethyl cellulose, polytetrafluoroethylene, polyethylene, polypropylene, polyacrylonitrile, ethylene-propylene-diene terpolymer (EPDM), sulfonated EPDM, fluororubber, vinylidene fluoride-hexafluoropropylene copolymers, and the like. Examples of the conductive agent include conductive inorganic compounds such as metals and conductive ceramics, conductive organic compounds such as conductive polymers, and the like.

On the surface of the non-facing portion of the negative composite layer, a peak intensity (IS) of peak due to 2p orbital of S and a peak intensity (IC) of peak due to 1s orbital of C in an X-ray photoelectron spectroscopy spectrum preferably have a relationship of 0.05<(IS/IC), more preferably have a relationship of 0.08<(IS/IC), and further preferably have a relationship of 0.10<(IS/IC)<0.50. In the present embodiment, the cyclic sulfone compound can contribute to the formation of SEI film more preferentially than the fluorinated carbonate. As a result, sulfur atoms (S) derived from the cyclic sulfone compound are present in the SEI film. When (IS/IC) on the surface of the non-facing portion of the negative composite layer is larger than 0.05, that is, when a sufficient amount of S atoms is present on the surface of the non-facing portion, a nonaqueous electrolyte secondary battery with less reduction of capacity can be obtained. This is because the SEI film made of the cyclic sulfone compound is favorably formed on the surface of the non-facing portion of the negative composite layer, and the reductive decomposition of fluorinated carbonate is effectively suppressed. Although the reduction of capacity due to decomposition of the fluorinated carbonate tends to be remarkable under a high voltage, in the present embodiment, it is possible to increase voltage of the nonaqueous electrolyte secondary battery, by setting to 0.05<(IS/IC). Usually, IS and IC satisfy the above ranges after the initial charge of the nonaqueous electrolyte secondary battery.

The peak intensity in the X-ray photoelectron spectroscopy spectrum can be obtained by X-ray photoelectron spectroscopy using an AlKα (monochromatic) line emitted under conditions of a voltage of 15 kV and a current of 10 mA. The peak due to 2p orbital of S is a maximum peak at 160 eV to 175 eV, and the peak due to 1s orbital of C is a maximum peak at 295 eV to 280 eV. More detailed measurement conditions of X-ray photoelectron spectroscopy are as follows.

A battery in a discharged state is disassembled in a glove box, and a negative electrode plate is taken out from a battery case. After washing the taken-out negative electrode plate 3 times or more with DMC with a purity of 99.9% or more and a water content of 20 ppm or less, the DMC is removed by vacuum drying, then a predetermined region of the negative electrode plate was cut out, and transferred into a photoelectron analyzer (X-ray photoelectron analyzer AXIS-NOVA type MB5 specification manufactured by KRATOS) using a transfer vessel, and X-ray photoelectron spectroscopy is performed.

<Positive Electrode Plate>

As described above, a positive electrode plate includes a positive electrode current collector, and a positive composite layer disposed on at least one surface of the positive electrode current collector. As the positive electrode current collector, for example, a metal foil such as an aluminum foil is used.

The positive composite layer contains a positive active material capable of absorbing and desorbing lithium ions. As the positive active material, transition metal oxides that absorb and desorb lithium, such as composite oxides represented by composition formula $Li_xMO_2$, $Li_yM_2O_4$, $Na_xMO_2$ (wherein M is one or more transition metals, $0 \leq x \leq 1$, $0 \leq y \leq 2$), a tunnel structure or a layered structure metal chalcogenides and metal oxides, can be used. Specific examples thereof include $LiCoO_2$, $LiNiO_2$, $LiNi_{1/2}Mn_{1/2}O_2$, $LiNi_{1/3}Mn_{1/3}Co_{1/3}O_2$, $LiCo_xNi_{1-x}O_2$, $LiMn_2O_4$, $Li_2Mn_2O_4$, and the like.

<Separator>

As the separator, for example, a microporous membrane, a nonwoven fabric or the like consisting mainly of a polyolefin resin such as polyethylene or polypropylene is used. The microporous membrane may be used alone as a single-layer membrane, or plural membranes may be combined and used as a composite membrane. Moreover, the microporous membrane may contain an appropriate amount of additives such as various plasticizers, antioxidants, and flame retardants. In addition, a porous heat-resistant layer containing inorganic compound particles (inorganic filler) may be provided on the surface of the microporous membrane, for the purpose of preventing internal short-circuit and the like.

<Area of Non-Facing Portion>

In a wound electrode assembly in which a positive electrode plate and a negative electrode plate are wound with a separator interposed therebetween, a band-shaped positive electrode plate and a band-shaped negative electrode plate are used. By making the width of the band-shaped negative electrode plate wider than the width of the band-shaped positive electrode plate, a non-facing portion of the negative electrode plate can be provided. In addition, by making the band-shaped negative electrode plate longer than the band-shaped positive electrode plate, a non-facing portion of the negative electrode plate can be provided at the beginning or end of winding.

In a laminated electrode assembly in which a positive electrode plate and a negative electrode plate are laminated with a separator interposed therebetween, a non-facing portion of the negative electrode plate can be provided by making the area of the negative electrode plate larger than the area of the positive electrode plate.

<Storage Process>

By storing the nonaqueous electrolyte secondary battery in a charged state, formation of a film on the surface of the negative electrode plate can be promoted. Preferably, the battery is charged at SOC 20 to 50% (charged to 20 to 50% of rated capacity) and stored at room temperature (15 to 35° C.) for 12 hours or more.

EXAMPLES

Hereinafter, the present invention will be described based on examples, but the present invention is not limited thereto.

Example 1

<Preparation of Positive Electrode Plate>

To N-methyl-2-pyrrolidone (NMP) were added 4.5 parts by weight of a conductive additive (acetylene black), 4.5 parts by weight of a binder (PVdF), and 91 parts by weight of an active material ($LiNi_{0.8}Co_{0.15}Al_{0.05}O_2$ particles), and the mixture was mixed to prepare a positive electrode paste. The prepared positive electrode paste was applied onto both surfaces of a positive electrode current collector (aluminum foil) so that the applied amount (basis weight) after drying was 15 mg/cm² to form a positive composite layer. A layered product of the positive electrode current collector and the positive composite layer was roll-pressed to obtain a band-shaped positive electrode plate.

<Preparation of Negative Electrode Plate>

A negative electrode paste was prepared using graphite, styrene-butadiene rubber and carboxymethyl cellulose in a weight ratio of 95:2:3 (solid content ratio) and water as a solvent. The prepared negative electrode paste was applied onto both surfaces of a negative electrode current collector (copper foil) so that the applied amount (basis weight) after drying was 9 mg/cm² to form a negative composite layer. A layered product of the negative electrode current collector and the negative composite layer was roll-pressed to obtain a band-shaped negative electrode plate.

<Separator>

As the separator, a polyethylene microporous membrane having a heat-resistant layer containing alumina on one side was used. Further, the heat-resistant layer was faced to the positive electrode.

<Preparation of Nonaqueous Electrolyte Solution>

As the nonaqueous electrolyte solution, one prepared by the following method was used. As a nonaqueous solvent, a mixed solvent of 10 parts by volume of monofluoroethylene carbonate (FEC) as a fluorinated carbonate and 90 parts by volume of ethyl methyl carbonate was used. An electrolyte salt ($LiPF_6$) was dissolved in this nonaqueous solvent so as to have a concentration of 1 mol/L to prepare a nonaqueous electrolyte solution. Further, 1,3-propene sultone (PRS) was dissolved in the nonaqueous solvent. The amount of PRS added was set to 2 parts by weight, based on 100 parts by weight of the nonaqueous electrolyte solution.

<Preparation of Unfilled Battery>

An electrode assembly was prepared by winding the positive electrode plate and the negative electrode plate with the separator interposed therebetween. By making the width of the band-shaped negative electrode plate wider than the width of the band-shaped positive electrode plate and making the negative electrode plate longer than the positive electrode plate at the beginning and end of winding, the area of the non-facing portion of the negative composite layer was adjusted to be 7% with respect to the total area of the non-facing portion and the facing portion. The electrode assembly prepared by winding was inserted into an aluminum case body, and the positive electrode terminal and the negative electrode terminal provided on a lid were electrically connected to the positive electrode plate and the negative electrode plate, respectively, then the case body and the lid were welded in an unfilled state (an electrolyte solution was not filled) to prepare a battery.

<Electrolyte Solution Filling>

The electrolyte solution was filled from an electrolyte solution filling hole provided in the lid. After sealing the electrolyte solution filling hole, the electrolyte solution was charged to SOC 30% (charged to 30% when the rated capacity is 100%), and stored at 25° C. for 24 hours for forming a film on the surface of the non-facing portion of the negative electrode plate to obtain a nonaqueous electrolyte secondary battery.

Example 2

A nonaqueous electrolyte secondary battery was obtained similarly as in Example 1, except that diglycol sulfate (DGLST) was used instead of 1,3-propene sultone added to the nonaqueous electrolyte solution.

Example 3

A nonaqueous electrolyte secondary battery was obtained similarly as in Example 1, except that the area of the non-facing portion was set to 9% with respect to the total area of the non-facing portion and the facing portion.

Example 4

A nonaqueous electrolyte secondary battery was obtained similarly as in Example 3, except that diglycol sulfate was used instead of 1,3-propene sultone added to the nonaqueous electrolyte solution.

Example 5

A nonaqueous electrolyte secondary battery was obtained similarly as in Example 1, except that the area of the non-facing portion was set to 13% with respect to the total area of the non-facing portion and the facing portion.

Example 6

A nonaqueous electrolyte secondary battery was obtained similarly as in Example 5, except that diglycol sulfate was used instead of 1,3-propene sultone added to the nonaqueous electrolyte solution.

Comparative Examples 1 to 3

Nonaqueous electrolyte secondary batteries of Comparative Example 1, Comparative Example 2 and Comparative Example 3 were obtained similarly as in Example 1, Example 3 and Example 5, respectively, except that 1,3-propene sultone was not added to the nonaqueous electrolyte solution.

Reference Examples 1 to 3

Nonaqueous electrolyte secondary batteries of Reference Example 1, Reference Example 2 and Reference Example 3 were obtained similarly as in Example 1, Example 2 and Comparative Example 1, respectively, except that the area of the non-facing portion was set to 5% with respect to the total area of the non-facing portion and the facing portion.

Reference Examples 4 and 5

Nonaqueous electrolyte secondary batteries of Reference Example 4 and Reference Example 5 were obtained similarly as in Reference Example 1 and Comparative Example 2, respectively, except that, at the time of preparation of the nonaqueous electrolyte solution, ethylene carbonate (EC) was used instead of FEC as the nonaqueous solvent.

<Evaluation>

The nonaqueous electrolyte secondary batteries obtained in examples and comparative examples were charged to 4.35 V at a constant current of 1000 mA at 25° C., and further charged to a constant voltage at 4.35 V (positive electrode potential 4.45 (vs. Li/Li$^+$)), such that the battery was charged for a total of 3 hours including constant current charge and constant voltage charge, and this amount of charge was taken as "initial amount of charge". Next, the battery was stored at 60° C. for 15 days. Thereafter, the battery was discharged to an end-of-discharge voltage of 2.5 V at a constant current of 1000 mA at 25° C., and this discharge capacity was taken as "residual capacity". (Initial amount of charge−Residual capacity)/Initial amount of charge×100 was taken as self discharge rate (%). Table 1 shows the self discharge rate of each nonaqueous electrolyte secondary battery.

TABLE 1

| | Non-facing portion area ratio (%) | Nonaqueous solvent | Cyclic sulfone compound | Self discharge rate (%) |
|---|---|---|---|---|
| Example 1 | 7 | FEC/EMC | PRS | 14 |
| Example 2 | 7 | FEC/EMC | DGLST | 14 |
| Comparative Example 1 | 7 | FEC/EMC | — | 18 |
| Example 3 | 9 | FEC/EMC | PRS | 16 |
| Example 4 | 9 | FEC/EMC | DGLST | 16 |
| Comparative Example 2 | 9 | FEC/EMC | — | 31 |
| Example 5 | 13 | FEC/EMC | PRS | 18 |
| Example 6 | 13 | FEC/EMC | DGLST | 18 |
| Comparative Example 3 | 13 | FEC/EMC | — | 35 |
| Reference Example 1 | 5 | FEC/EMC | PRS | 10 |
| Reference Example 2 | 5 | FEC/EMC | DGLST | 11 |
| Reference Example 3 | 5 | FEC/EMC | — | 13 |
| Reference Example 4 | 5 | EC/EMC | — | 11 |
| Reference Example 5 | 9 | EC/EMC | — | 14 |

As is apparent from the comparison between Reference Example 4 and Reference Example 3 and the comparison between Reference Example 5 and Comparative Example 2, addition of FEC to the nonaqueous solvent causes an increase in self discharge. According to the examples of the present application, a cyclic sulfone compound was contained in the nonaqueous electrolyte solution, whereby the self discharge can be suppressed.

Also, as shown in Reference Example 3, Comparative Example 1, Comparative Example 2 and Comparative Example 3, when a cyclic sulfone compound is not contained in the nonaqueous electrolyte solution, the increase in self discharge is significant at a non-facing portion area ratio of 7% or more. On the other hand, as shown in Examples 1 to 6, when a cyclic sulfone compound is contained in the nonaqueous electrolyte solution, self discharge can be suppressed even if the non-facing portion area ratio is 7% or more. The self discharge suppressing effect obtained by containing a cyclic sulfone compound is more remarkable when the non-facing portion area ratio is 9% or more.

DESCRIPTION OF REFERENCE SIGNS

1 Facing portion
2 Non-facing portion
10 Positive electrode plate
11 Positive electrode current collector
12 Positive composite layer
20 Negative electrode plate
21 Negative electrode current collector
22 Negative composite layer

The invention claimed is:

1. A nonaqueous electrolyte secondary battery comprising:
a power generating element configured by winding a positive electrode plate including a positive composite layer and a negative electrode plate including a negative composite layer with a separator interposed therebetween; and
a nonaqueous electrolyte containing a fluorinated carbonate, wherein
the negative composite layer comprises a facing portion facing a surface of the positive composite layer, and a non-facing portion that is on the same surface as the facing portion and does not face the surface of the positive composite layer,
the area ratio of the non-facing portion to a combined area of the facing portion and the non-facing portion of the negative composite layer is 7% or more and 13% or less,
the nonaqueous electrolyte contains a cyclic sulfone compound,
the fluorinated carbonate consists of a fluorinated cyclic carbonate, and
the cyclic sulfone compound is at least one of cyclic unsaturated sultone compounds represented by general formula (1) or cyclic sulfonic acid ester compounds represented by general formula (2):

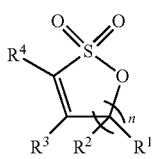  (1)

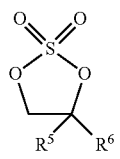  (2)

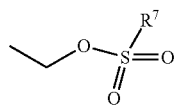

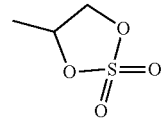  (4)

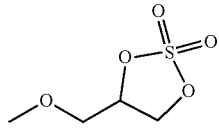  (5)

wherein $R^1$, $R^2$, $R^3$, $R^4$ and $R^5$ are each independently hydrogen, fluorine or a hydrocarbon group having 1 to 4 carbon atoms which may contain fluorine, and n is an integer of 1 to 3, $R^6$ is a group represented by formula (3), formula (4) or formula (5) and $R^7$ is an alkyl group having 1 to 3 carbon atoms which may contain a halogen.

2. The nonaqueous electrolyte secondary battery according to claim 1, wherein a positive electrode potential based on lithium during charge reaches 4.4 V (vs. Li/Li$^+$) or more.

3. The nonaqueous electrolyte secondary battery according to claim 1, on the surface of the non-facing portion, a peak intensity (IS) of peak due to 2p orbital of S and a peak intensity (IC) of peak due to 1s orbital of C in an X-ray photoelectron spectroscopy spectrum have a relationship of 0.05<(IS/IC).

4. The nonaqueous electrolyte secondary battery according to claim 1, wherein the content of the fluorinated carbonate is 5% by volume or more and 30% by volume or less, based on the total amount of the nonaqueous electrolyte excluding an electrolyte salt.

5. The nonaqueous electrolyte secondary battery according to claim 1, wherein the area ratio of the non-facing portion to a combined area of the facing portion and the non-facing portion of the negative composite layer is 7% or more and 9% or less.

6. The nonaqueous electrolyte secondary battery according to claim 1, wherein the cyclic sulfone compound is at least one of 1,3-propene sultone or diglycol sulfate.

7. The nonaqueous electrolyte secondary battery according to claim 1, wherein the fluorinated cyclic carbonate is monofluoroethylene carbonate.

8. The nonaqueous electrolyte secondary battery according to claim 7, wherein the nonaqueous electrolyte further contains ethyl methyl carbonate.

* * * * *